(12) United States Patent
Johansson et al.

(10) Patent No.: US 7,355,325 B2
(45) Date of Patent: Apr. 8, 2008

(54) WIDE FREQUENCY RANGE ELECTROMECHANICAL ACTUATOR

(75) Inventors: Stefan Johansson, Uppsala (SE); Johan Abrahamsson, Uppsala (SE); Robert Sunnerberg, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 0 days.

(21) Appl. No.: 11/455,293

(22) Filed: Jun. 15, 2006

(65) Prior Publication Data

US 2007/0290576 A1 Dec. 20, 2007

(51) Int. Cl.
*H02N 2/00* (2006.01)

(52) U.S. Cl. ............ 310/328; 310/323.01; 310/323.04; 310/323.17; 310/330; 310/331; 310/332

(58) Field of Classification Search ........... 310/323.01, 310/323.02, 323.04, 323.05, 323.08, 323.13, 310/323.16, 323.17, 328, 12, 330–332
See application file for complete search history.

(56) References Cited

U.S. PATENT DOCUMENTS

| | | | | |
|---|---|---|---|---|
| 3,928,778 A | * | 12/1975 | Ivanov et al. | 310/331 |
| 4,523,120 A | * | 6/1985 | Assard et al. | 310/323.17 |
| 4,742,260 A | * | 5/1988 | Shimizu et al. | 310/323.16 |
| 4,785,177 A | * | 11/1988 | Besocke | 250/442.11 |
| 5,345,137 A | | 9/1994 | Funakubo et al. | |
| 5,438,232 A | * | 8/1995 | Inoue et al. | 310/328 |
| 5,900,691 A | * | 5/1999 | Reuter et al. | 310/348 |
| 5,942,837 A | * | 8/1999 | Reuter | 310/328 |
| 6,066,911 A | | 5/2000 | Lindemann et al. | |
| 6,323,583 B1 | * | 11/2001 | Gunther et al. | 310/330 |
| 6,603,239 B1 | * | 8/2003 | Michely et al. | 310/328 |
| 6,798,117 B2 | | 9/2004 | Johansson et al. | |
| 2005/0073219 A1 | | 4/2005 | Johansson et al. | |

FOREIGN PATENT DOCUMENTS

| JP | 59-99977 | * | 6/1984 |
|---|---|---|---|
| JP | 4-161077 | * | 6/1992 |

* cited by examiner

*Primary Examiner*—Thomas M. Dougherty
(74) *Attorney, Agent, or Firm*—Young & Thompson

(57) ABSTRACT

An electromechanical motor (1), using at least two bimorph, monomorph or multimorph electromechanical actuating elements (6) interconnected by a common actuator backbone (5) is disclosed. The actuating elements (6) are controllable in both a longitudinal direction (L), i.e. in the main extension direction of the actuating element (6), and a flexural direction, i.e. bending of the actuating element (6), separately. The different actuating elements (6) can be controlled individually as well. The actuator (3) dimensions are preferably selected to resonance frequencies in vicinity of a certain frequency. The actuating elements (6) are provided with interaction portions (7) at which any contact between the actuator and a body (2) to be moved is made. In order to operate well both in fine-positioning and resonant motion, the interaction portions (7) are arranged to partially suppress the transfer of acoustic waves between the actuating elements (6) and the body (2) to be moved.

25 Claims, 8 Drawing Sheets

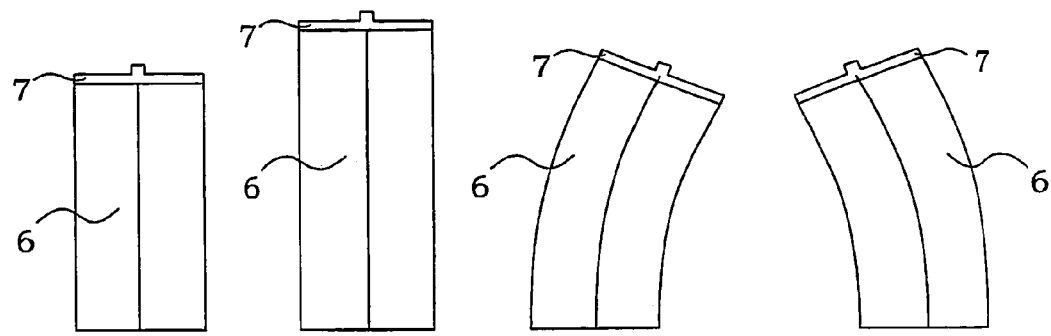
Fig. 5
Fig. 7
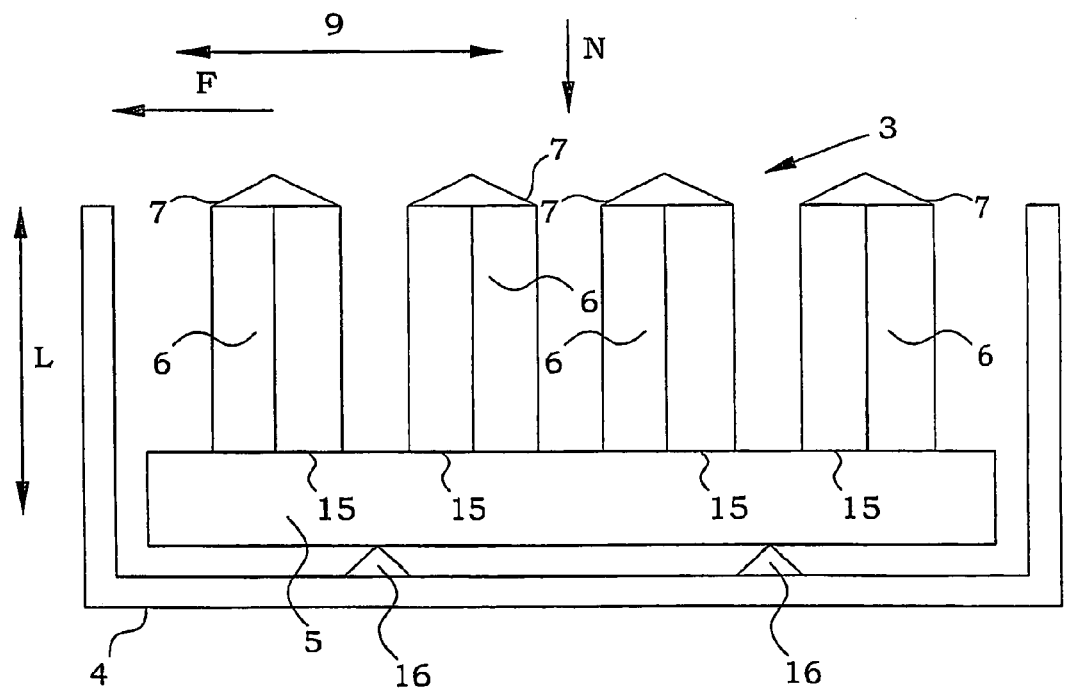

WIDE FREQUENCY RANGE ELECTROMECHANICAL ACTUATOR

TECHNICAL FIELD

The present invention relates to electromechanical actuator devices and methods for designing such devices.

BACKGROUND

There are numerous applications with the need for extremely miniaturized motors. For example, in consumer products extremely small, low weight, low power consumption and inexpensive motors are typically requested. The motion range is often in the order of millimeters and with a requested accuracy of micrometers. A number of performance properties are typically requested, e.g. high speed, silent movement, low power consumption, easily controlled positioning and high positioning accuracy, which to some extent are contradictory.

In order to reach highly accurate positioning that at the same time is relatively easily controlled, different motion mechanisms are selected, such as "walking" mechanisms, stick-slip mechanisms, "inertial" positioning or stepping mechanisms. Common for most devices operating according to such principles is that they involve a high degree of static contacting between an actuator and a body to be moved. The position accuracy relies to a large extent on this static contacting. However, the speed is often relatively low, the devices often operate at sub-ultrasonic frequencies, which may make them noisy, and the power efficiency is relatively poor. A typical example of such a device is disclosed in the U.S. Pat. No. 6,798,117.

In order to reach high speed and high power efficiency, other motion mechanisms are typically utilized. Common for most of these mechanisms is that they use mechanical resonances in one way or another. The actuator and/or body to be moved is thereby excited into vibration, thereby typically reducing the experienced friction between the actuator and the body to be moved. The power efficiency becomes generally high. In most cases, the geometrical dimensions are such that the selected frequencies are within the ultra-sonic range, which makes the operation relatively silent for human beings. However, positioning accuracy and/or easy control of e.g. start and stop sequences are difficult to achieve. A typical example of such a device is disclosed in the US patent application 2005/0073219.

In U.S. Pat. No. 5,345,137, an ultrasonic vibrator design is disclosed, which allows for a multi-dimensional motion of an actuating element. In U.S. Pat. No. 6,066,911, an ultrasonic driving element is disclosed, which has many similarities with the elements presented in U.S. Pat. No. 5,345,137. However, here a number of actuating elements positioned one after the other are used for achieving a combined ultrasonic frequency motion.

It has later been shown in the U.S. Pat. No. 6,798,117 that a similar main geometrical design as in U.S. Pat. No. 6,066,911 instead advantageously can be used for a fine-controlled walking mechanism. However, in order to achieve good operation properties, different detail designs are to prefer. Still, there are no prior art electromechanical actuators that operates well both with a fine-positioning mechanism and with a resonant high-speed mechanism.

SUMMARY

A general problem with prior art electromechanical actuators is that there are no appropriate designs allowing the electromechanical actuators to operate alternatively with a fine-positioning mechanism and with a high-speed resonant mechanism.

An object of the present invention is thus to provide devices that are possible to operate both according to a fine-positioning mechanism and according to a high-speed resonant mechanism. A further object of the present invention is to find operable compromises between contradictory design features of fine-positioning mechanism devices and high-speed resonant mechanism devices.

The above objects are achieved by devices and methods according to the enclosed patent claims. In general words, a general design using at least two bimorph, monomorph or multimorph electromechanical actuating elements interconnected by a common actuator backbone is used. The actuating elements are controllable in both a longitudinal direction, i.e. in the main extension direction of the actuating element, and a flexural direction, i.e. bending of the actuating element, separately. The different actuating elements can be controlled individually as well. The actuator dimensions are preferably selected to give both these two motion modes resonance frequencies in vicinity of a certain frequency. The actuating elements are provided with interaction portions at which any contact between the actuator and a body to be moved is made. In order to operate both in fine-positioning and resonant motion, the interaction portions are arranged to partially suppress the transfer of acoustic waves between the actuating elements and the body to be moved.

Preferably, there is a considerable mismatch in acoustic impedance between the electromechanical bimorph, monomorph or multimorph volumes and the interaction portion. Similarly, suppression the transfer of acoustic waves is provided either between the actuating elements and the actuator backbone or between the actuator backbone and an actuator stator portion, mechanically supporting the actuator backbone. In preferred embodiments, the interaction portions have an elasticity being a compromise between requests for fine-positioning and high-speed resonance motion. A longitudinal compression of the interaction portion and the actuating element should be within 10% and 90% of a maximum longitudinal extension of the actuating elements. Similarly, a transversal shearing of the interaction portion and the actuating element should be within 10% and 90% of a maximum bending stroke of the actuating elements. In further preferred embodiments, the actuating elements, including the interaction portion are designed to give the resonances of the longitudinal vibrations and/or the bending vibration a Q-value below 20, and even more preferably below 10.

BRIEF DESCRIPTION OF THE DRAWINGS

The invention, together with further objects and advantages thereof, may best be understood by making reference to the following description taken together with the accompanying drawings, in which:

FIG. 5 is a schematic illustration of vibration states of an actuating element of the actuator of FIG. 4;

FIG. 7 is a block scheme of another embodiment of an actuator according to the present invention;

DETAILED DESCRIPTION

The present invention is based on a number of new insights into the basic mechanisms of the interaction during fine-positioning operation versus during high-speed resonance operation. Since a design utilizing two actuating elements, comprising electromechanical bimorphs, interconnected by a common actuator backbone has been successfully used in fine-positioning and similar designs at least proposed to be used also in resonant devices, the detailed description mainly concerns such devices.

Figure 1:
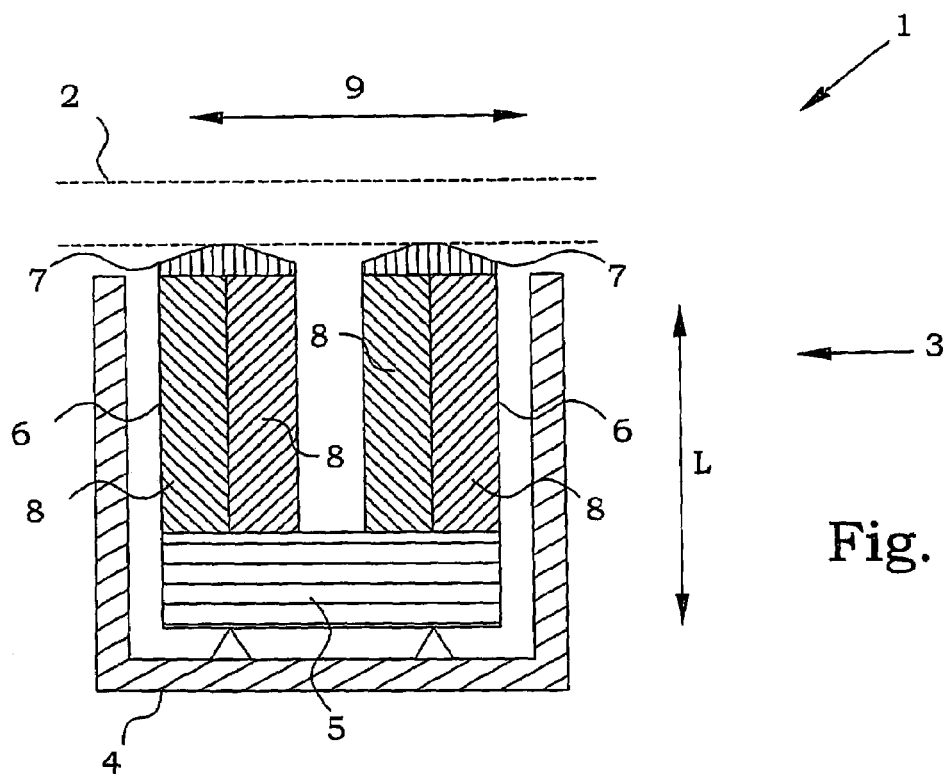
FIG. 1 is a block scheme of an embodiment of a motor according to the present invention.

FIG. 1 illustrates a basic embodiment of such an actuator design. An electromechanical motor 1 comprises an actuator 3 arranged to achieve a motion relative a body 2 to be moved. The actuator 3 comprises in this embodiment two actuating elements 6, mechanically connected to a common actuator backbone 5. The actuating elements 6 are occasionally in contact with the body 2 by interaction portions 7, positioned at the end of the actuating elements opposite to the actuator backbone 5. The actuator backbone is supported by an actuator stator portion 4, which typically constitutes the housing of the actuator 3. The actuating elements 6 comprises electromechanically active volumes 8, arranged as monomorphs, bimorphs or multimorphs having a main extension along the actuating element. In the present embodiment, bimorphs are illustrated.

The electromechanically active volumes 8 comprises in the present embodiment and in most following examples piezoelectric material. However, also other types of electromechanical materials, such as electrostrictive materials are possible to use for constructing the actuating elements. In the present embodiment, the active volume 8 is a piezoelectric bimorph, where the two parts of the bimorph are built by a multilayer stack of piezoelectric layers and exciting electrodes. The piezoelectric layers electrodes are in this embodiment oriented perpendicular to the main extension of the actuating element 6, i.e. essentially parallel to the main displacement direction 9. In alternative embodiments, the active volumes with electrodes may be oriented in the main displacement direction as well. By exciting the different parts of the bimorph by different voltage signals, the actuating element 6 can be bent or be extended or compressed in a longitudinal direction L, i.e. the interaction portion can be moved both parallel to a main displacement direction 9 of the body and perpendicular thereto.

One way to achieve fast and efficient operation is to drive the motor at a frequency corresponding to one or several resonant modes. It is particularly convenient to design the motor so that one longitudinal resonant mode has essentially the same resonance frequency as at least one flexural resonant mode. In that way both the longitudinal movement resulting in lifting and releasing of the interaction portion 7 and the flexural movement resulting in a displacement of the body 2 can be magnified for a given applied voltage signal. It is of course possible to design motors that utilize only one of the resonant modes. The design is normally made with computer aided numeric methods and a rough estimate of the frequency for the longitudinal mode for a cantilever is:

$$f_{longitudinal} = \frac{1}{4L}\sqrt{\frac{Y}{\rho}},$$

where L is the length of the cantilever, Y is Young's modulus and $\rho$ is the density. The flexural resonance modes can be estimated with help of:

$$f_{flexural} = \frac{K_n}{2\pi}\sqrt{\frac{Yt^2}{12\rho L^4}},$$

where t is the thickness and $K_n$ is a constant for a mode of order n. These constants $K_n$ are highly dependent of the boundary conditions of the cantilever as well as of the order n of the resonance.

To design a motor for simultaneous longitudinal and flexural resonance the length is first selected to get a suitable frequency of the actuating element. It is desirable to select a frequency in the inaudible range, e.g. larger than 20 kHz. Secondly the thickness of the element is selected to make the flexural resonance coincide with the longitudinal resonance. According to the above relations, the thickness for an ideal, slender cantilever, the thickness should be selected approximately according to:

$$t = \frac{\pi\sqrt{3}}{K_n} \cdot L. \tag{1}$$

The constants $K_n$ are deeply related to how the motor is designed, which will be commented further below. This choice of thickness should be optimum only for ideal slender actuating elements, having a well defined attachment to a backing. However, the thickness could be used as an approximation also for other cases, whereby some tuning in practice is necessary to fine adjust the resonances.

According to the present invention, the interaction portions were found to be very crucial components in such an actuator.

When trying to analyze fine-walking performance, it was discovered that a restriction is that the total available elongation change of the actuator has to be large enough to ensure that there is no contact with the body to be moved when the actuating element is contracted. In other words, when an actuating element should return to its original position for starting a new "step", it should be allowed to move freely without any friction. This puts some restrictions on any interaction portion of the actuators as well as on the coplanarity of the surfaces. To achieve controlled positioning by a walking mechanism, the interaction portions have to be coplanar within a small fraction of the leg extension. If a certain element extension in the longitudinal direction is assumed, the legs should preferably be planar within a tenth of this value in order to guarantee a good control during walking.

The discussed motor type is based on a certain friction action between an actuating element and the body to be moved. Such an actuator thus needs some type of normal force pressing the interaction portions against the body to be moved. If the interaction portions should be very resilient, then the normal force would compress the interaction portion (and to some extent also the electromechanical volume). Too high normal forces, or a very soft interaction portion will lead to that the interaction portion cannot release from the body at any extension of the actuating elements. Hence, it would not be possible to perform any walking motion at all. In other words, the interaction portion cannot be too resilient, since the available longitudinal extension of the actuating element has to exceed, with a certain margin, any compression of the actuators when exposed for the intended maximum normal force.

Furthermore, during quasi-static fine-walking, a hard and stiff interaction portion is to prefer. Any resilience in the actuating element and interaction portion will decrease the step length in a walking operation, and as a consequence the speed etc. will decrease. The fine-positioning control, e.g. the positioning resolution, is also much improved with stiff legs and in particular stiff interaction portions.

On the other hand, when trying to analyze resonant performance, it was discovered that hard and stiff interaction portions should be avoided. Resonant motion of actuating elements having hard interacting portions will typically render in large wear of the interacting surfaces. Also, since the motors inevitably have internal power losses it has to transport heat away from the actuating elements to the motor housing. This is more important at high-speed operation than during fine-positioning. Furthermore, in many cases, the operation of a resonant actuator having a very still interaction portion will be highly dependent on a lot of factors that might be difficult to control, such as properties of the body to be moved, and in particular its surface, the driving conditions, the normal force etc. This is not desirable in any motor and in particular for motors that should be robust and adaptable to various applications. If e.g. the resonance frequency is influenced by driving conditions, it is necessary to have drive electronics that track the resonance frequency for utilising the power efficiency as good as possible. However, such drive electronics is complex and expensive.

Ideally a resonator used for motor operation should be built so that a small fraction of the resonant energy is used for output work with no or little influence on the resonator and the resonance frequency. This is why motors optimized for walking mechanisms typically are less suitable for resonance operation. The task is thus to find a compromise that is acceptable for both operation modes.

In an arrangement based on actuating elements interconnected by an actuator backbone, resonant operation appears to work well when the interaction portions are arranged for partially suppressing transfer of acoustic waves between the actuating elements and the body to be moved. This will reduce the influence of waves, reflected and possibly modified by the body to be moved, on the resonant behavior. This can be achieved by use of interaction portions that have a relatively large mismatch in acoustic impedance compared to the rest of the actuating element. The simplest implementation is to use an interaction portion with a different density and/or modulus of elasticity. If the cross-section of the interaction portion changes in a stepwise manner along the longitudinal direction, the acoustic wave will also to a large extent be reflected.

In a resonant operation, the resonance can be viewed as a series of acoustic waves that are propagating through the actuating element. Waves are reflected at different boundaries and at resonance conditions, standing waves are formed by positive interference between the different waves. Without any contact with a body to be moved, essentially all acoustic waves are reflected. A negligible amount of acoustic energy is emitted as pressure waves in the surrounding media. However, when the actuating elements are in contact with the body, the conditions are changed. By having an interaction portion having the same acoustic impedance as the rest of the actuating element, a large portion of the acoustic energy available in the actuating element can be transferred to the body, and vice versa. To avoid contact dependent behaviour and get a stable and robust operation there should preferably be an acoustic mismatch between acoustic elements and the body to be moved.

However, by increasing the inherent reflection within the actuating element itself, the transfer of acoustic energy can be reduced. In an ideal case, the reflectance R of an acoustic wave at an interface can be expressed as:

$$R = \left| \frac{Z_1^2 - Z_2^2}{Z_1^2 + Z_2^2} \right|,$$

where $Z_1^2$ and $Z_2^2$ are acoustic impedances of the volumes on each side of the interface, and the transmission T as:

$$T = 1 - R.$$

One then realizes that a difference in acoustic impedance will reflect more energy. The energy stored as mechanical motion of the resonating body can then be made large, and only a small portion is transferred over the interface. A large mismatch between acoustic impedance of the interaction portion and the acoustic impedance of the rest of the actuating element thus reduces the exchange of energy between the body and the actuating element. Preferably, the mismatch is larger than 50%. However, the mismatch has to be large enough to allow some energy to be transferred in the flexural direction, enough for performing the moving operation of the body. By reducing the exchange of acoustic energy in particular in the longitudinal direction, the influence of the body on the resonant behaviour will also be reduced, thereby reducing or completely eliminating the need for tracking the resonance frequency.

Furthermore, the acoustic impedance Z is approximately:

$$Z \approx \sqrt{Y \cdot \rho}$$

where Y is the elastic modulus and $\rho$ is the density. This means that an interaction portion being more elastic than the electromechanical material of the main actuating element would give rise to such an impedance mismatch. Since an increased resilience of the interaction portion also would decrease the problems of wear, a somewhat resilient interaction portion is to prefer. However, the stiffness has to be large enough to ensure a proper fine-positioning operation.

Figure 2:
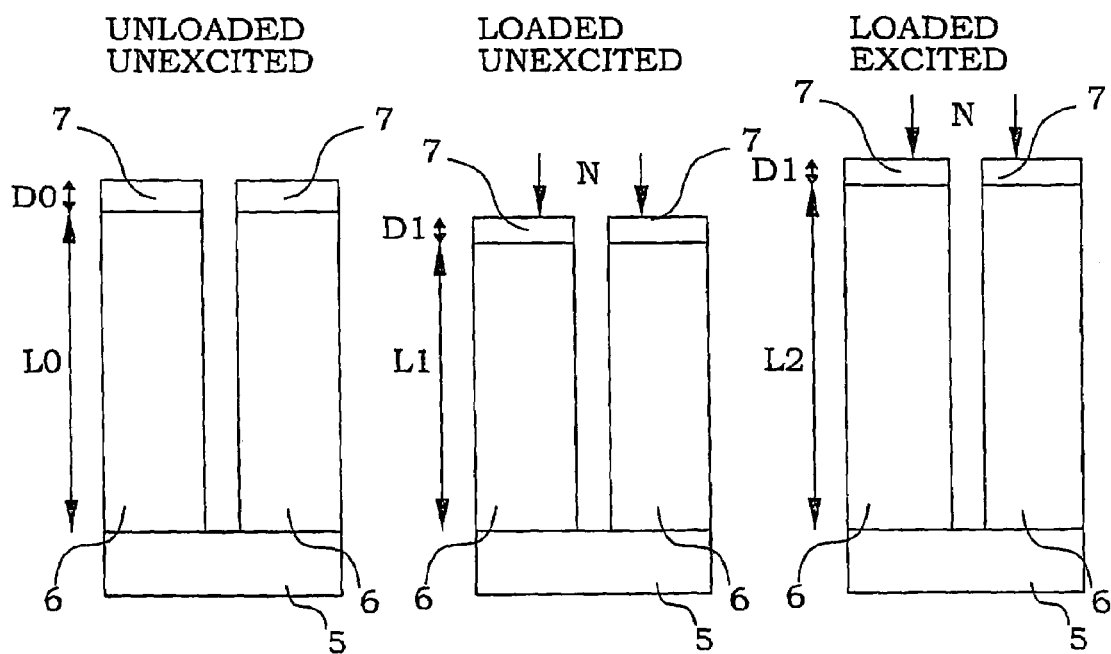
FIG. 2 are schematic illustrations of relations of longitudinal extension of actuating elements during different conditions.

Typically the interaction portion has to be much more resilient than the ideal walking interaction portion. A good compromise is to have a resilience that gives a longitudinal shape change of the interaction portion that is a fraction of the total longitudinal extension of the leg, for the given normal force. This is schematically illustrated in FIG. 2. In the left part, a situation where an actuator is unloaded and unextended is shown. The electromechanical part of the actuating element has a length L0 and the interaction portion has a thickness of D0. In the middle portion of FIG. 2, a situation, where the actuator is loaded with a normal force F is illustrated. The electromechanical part of the actuating element has been compressed to a length L1, and the interaction portion has decreased its thickness to D1. The compression of the electromechanical part of the actuating element is C1=L0−L1 and the compression of the interaction portion is C2=D0−D1. In the right part of the FIG. 2, the actuating element is excited in the longitudinal direction, giving the electromechanical part of the actuating element a length L2, while the interaction portion still has a thickness of essentially D1. The maximum extension of the actuating element is thus E=L2−L1. From this illustration it is seen that in order to be able to operate with walking mechanism, the surface of the interaction portion of the rightmost situation has to be above the surface of the interaction portion of the leftmost situation. In other words:

$$L0+D0<L2+D1$$

which is equivalent to $$L0-L1+D0-D1<L2-L1$$

or $$C2+C1<E.$$

With a reasonable margin, a longitudinal compression of the interaction portion and the actuating element should then be less than 90% of a maximum longitudinal extension of the actuating elements, and preferably less than 75%.

The stiffness needed for resonant behaviour, discussed further above, can also be expressed in corresponding terms. A longitudinal compression of the interaction portion and the actuating element should then be larger than 10% of a maximum longitudinal extension of the actuating elements, and preferably larger than 25%.

To a certain extent the previous argument is also valid for the tangential resilience, i.e. in the bending/flexural direction. The shear/bending deformation of the interaction portions (and of the actuating elements themselves), should be only a fraction of the total tangential movement of the actuating elements, at a desired tangential force output of the motor. Also here a practical upper limit is 90% and preferably 75%, while there is no lower bound as will be discussed below. Depending on the application the preferred fractions could be selected different and separately for longitudinal resilience and tangential resilience, since the resonant behaviour will be more robust and insensitive to application circumstances with a large fraction, while the positioning performance will improve with a smaller fraction. The application could in some cases demand a high-force output and in this case the selection of the tangential resilience will be more crucial.

The partially suppression of transfer of acoustic waves between body and actuator assists in reducing the resonance frequency dependence on various driving conditions. However, also other design properties may give similar results. A goodness (Q) of a resonance is often closely related to the ratio between a certain displacement at resonance and the same displacement at a static condition. Another common definition is to use the ratio between the resonance frequency and the full-width half-maximum measure of the resonant behaviour. Regardless of what definition is used, a resonance having a high Q, i.e. having a high degree of enhancement, also has a narrow range within which the resonance takes place. If a high-Q resonance is used in an electromechanical motor, the operation becomes very sensitive to changes in frequencies. However, by reducing the Q value on purpose, will increase the frequency region, in which an acceptable enhancement is achieved.

Figure 3:
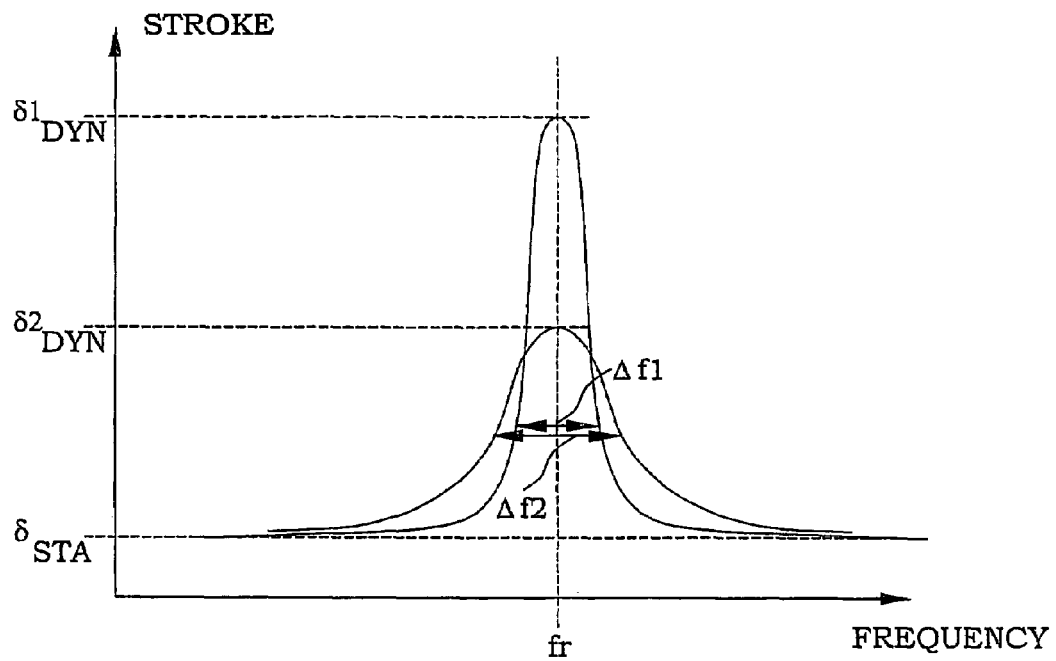
FIG. 3 is a diagram illustrating the influence of different resonance Q values.

This is schematically illustrated in FIG. 3. A high-Q resonance, illustrated by a curve 100, is possible to achieve within a relatively narrow frequency range $\Delta f1$ around the resonance frequency $f_r$. A dynamic value of the quantity in question, e.g. a resonant vibration stroke, is increased to $\delta 1_{dyn}$, as compared with $\delta 1_{sta}$ for a static stroke. A resonance having a lower Q value, illustrated by a curve 101, gives a lower ultimate enhancement $\delta 2_{dyn}$. However, an acceptable enhancement is instead provided in a wider frequency range $\Delta f2$. In view of the discussion above, the interaction portion type and acoustic impedance can be selected to make the frequency shift as small as possible for the given variations in driving conditions in the given application. The obtained possible frequency shift can then used to select an appropriate Q-value of the resonator. With a small frequency shift, the Q-value could be selected somewhat higher without loosing too much in performance when the conditions changes. Analogously, with a large frequency shift, the Q-value should be selected somewhat lower in order to ensure that any performance at all can be obtained when the conditions changes.

From practical experiments and design considerations, it has been found that resonances having Q values around 10 are typical. A reasonable range for practically usable Q values can be estimated to be 5 to 25.

One method of changing the Q-value is to change the proportions of high and low Q-value materials in the resonator, in a general case both in the actuating elements and in the backbone, as well as in the intermediate components, the interaction portions and the housing. Another method is to allow a certain fraction of the acoustic energy to dissipate from the resonator to the surrounding components. For instance, the housing is typically filled with a polymer to protect the ceramic unit and this will have a damping effect reducing the Q-value. The piezoceramic material itself can also be selected with respect to the mechanical Q-value.

Figure 4:
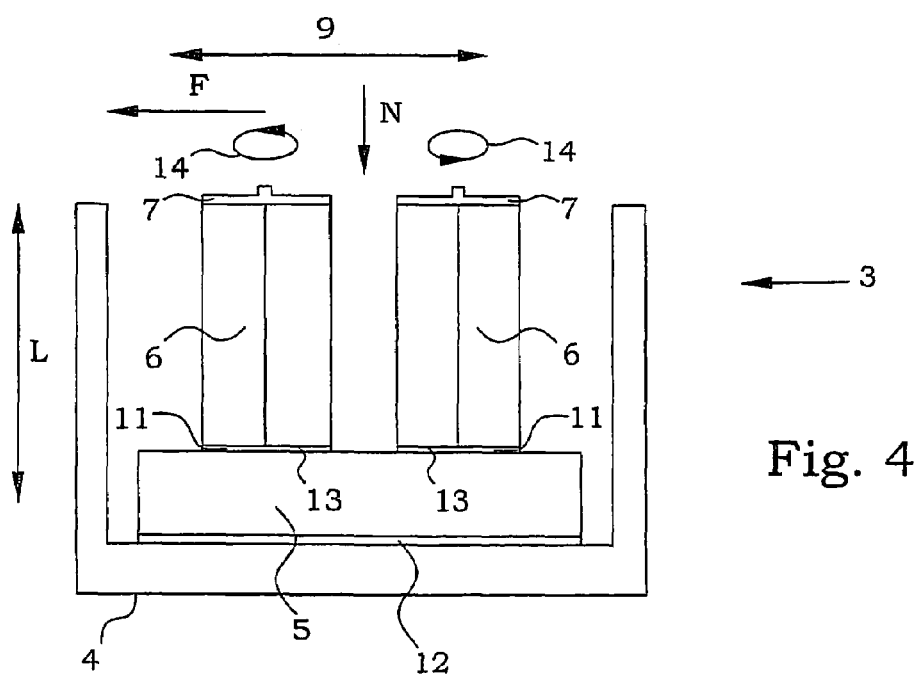
FIG. 4 is a block scheme of an embodiment of an actuator according to the present invention.

FIG. 4 illustrates one embodiment of an actuator 3 according to the present invention. The actuator 3 comprises two "legs" or actuating elements 6 attached to a common backbone 5. In the present embodiment, the actuating elements 6 are attached to the backbone by glue 11. However, in other embodiments, various other attachment methods can also be utilized, e.g. brazing, soldering and co-sintering. In the present embodiment, the glue 11 between the actuating element 6 and the backbone 5 will in addition to its fastening properties also at least partially separate the acoustic behavior of the actuating elements 6 from the acoustic behavior of the backbone 5. The vibration properties of the actuating elements 6 will then mainly depend on the internal element properties and only to a minor extent on the backbone properties. However, the end 13 of the actuating element 6 facing the backbone 5 will be restricted in its motion.

The illustrated actuator 3 is linear, and the two actuating elements 6 are placed one after the other in line in the main displacement direction 9 of the body to be moved (not shown in this figure). In an alternative embodiment, a rotating actuator can be made, e.g. by assembling three such units in a circle. The actuating elements 6 are dimensioned to have a longitudinal resonance at essentially the same frequency as a flexural resonance, i.e. a bending. Typically, the first basic longitudinal resonance tone is used. When these actuating elements 6 are driven with phase shifted signals, e.g. sinusoidal signals, the interaction portions 7 on top of the actuating elements 6 will move along elliptical trajectories 14. In this embodiment, the actuating elements 6 will be wider than thick to avoid undesired resonance modes. The backbone 5 will be fixed against an actuator stator portion 4, in this embodiment also being an actuator housing, with glue 12 or some other attachment method. The actuator stator portion 4 is in this embodiment shaped to have a high stiffness, apart from being made of a material with high stiffness, and results in an acoustic mismatch between the resonating unit, i.e. actuating elements 6 and to some limited extent the backbone 5, and the actuator stator portion 4 itself. The dimensions and materials are, according to the general discussions above, selected to get a small difference in resonance frequency when the body to be moved is pressed against the interaction portions 7 with the selected normal force F and a desired output tangential force T. In this way, the actuator will operate well in its particular application.

FIG. 5 illustrates the main vibration properties of one of the actuating elements 6 of the embodiment of FIG. 4, however, extremely exaggerated in magnitude in order to be visible for the viewer. Here it can be seen that a bending or flexural motion is possible to combine with a longitudinal expansion/contraction motion in order to move the interaction portion in an elliptical path. The other actuating element can be driven in a similar manner, in certain applications with a predetermined phase shift relative to the first actuating element.

Figure 6A:
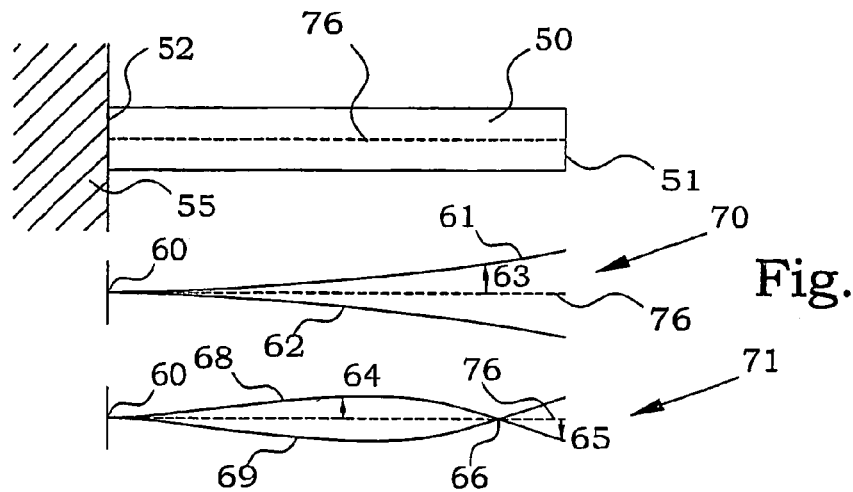
FIGS. 6A-C are illustrations of flexural resonance modes for beams having different boundary conditions.

Previously in the present disclosure, it was mentioned that resonances of flexural motions is preferably combined with resonances of longitudinal expansion/contraction. The flexural vibrations are, however, relatively complex and some additional explanations can be useful. In FIG. 6A, a continuous uniform cantilever beam 50 is illustrated. The beam 50 is in this embodiment fixed at a first end 52 to a fundament 55, which restricts the vibration behaviour of the beam 50. The beam 50 is thereby not allowed to exhibit any displacement nor tilting at the first end 52. A second end 51 of the beam 50 is in contrary free to move, i.e. both displacement and tilting is allowed.

A first resonant vibration mode 70 is qualitatively illustrated by means of two extreme strokes 61, 62 of a centre line 76 of a stationary beam. A first node 60, i.e. a point of the beam 50 that always is positioned on the centre line 76 is present at the attachment point to the fundament 55, i.e. at the first end 52. This first node 60 is a result of the boundary conditions towards the fundament 55. The first vibration mode 70 is the fundamental flexural resonance vibration of the beam 50 having the above described boundary conditions, i.e. the order n=1. This can also be seen by the fact that all parts of the beam always exhibit strokes 63 in the same direction. In other words, when the second end 51 of the beam is bent upwards, all interior parts of the beam 50 are also positioned above the centre line 76 (except for the point of the first node). The vibration mode 70 is associated with a constant $K_1^{free}$ when referring to the relation (1). For a thin slender beam, $K_1^{free} \approx 3.52$.

A second resonant vibration mode 71 is qualitatively illustrated by means of two extreme strokes 68, 69 of a centre line 76 of a stationary beam. A first node 60 is also here present at the attachment point to the fundament 55, i.e. at the first end 52. The second vibration mode 71 is the second order flexural resonance vibration of the beam 50 having the above described boundary conditions, i.e. the order n=2. This can also be seen by the fact that two sections of the beam always exhibit simultaneous strokes 64, 65 in opposite directions. In other words, when the second end 51 of the beam is bent upwards 65, some interior parts of the beam 50 are nevertheless positioned below 64 the centre line 76. This gives typically rise to a node 66 in the interior of the beam. The vibration mode 71 is associated with a constant $K_2^{free}$ when referring to the relation (1). For a thin slender beam, $K_2^{free} \approx 22.0$.

When considering the problem of adapting the thickness of an actuating element, using the fundamental resonance frequency, one realises that the required thickness becomes about 50% larger than the length. This may be somewhat difficult to achieve in typical designs. (Furthermore, the calculations of the constants assumed thin cantilevers, which may indicate that this relation is not the appropriate one.) However, use of the second order resonance would give a ratio between thickness and length of the actuating element in the order of ¼, which from a design point of view is more reasonable.

Figure 6B:
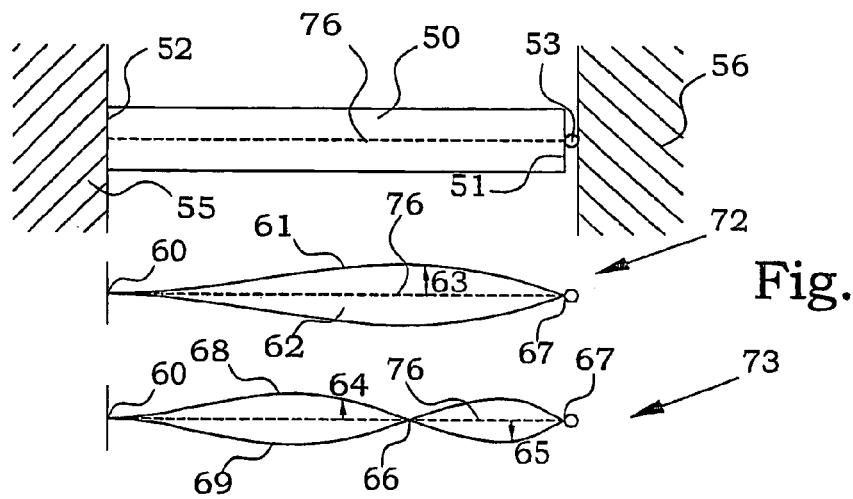

However, the flexural vibration of an actuating element is in practise not as ideal as described above. Since the actuating element interacts with the body to be moved at its second end, other boundary conditions are valid, at least during a part of a vibration cycle. In FIG. 6B, another continuous uniform cantilever beam 50 is illustrated. The beam 50 is in this embodiment fixed at a first end 52 to a fundament 55, which restricts the vibration behaviour of the beam 50. The beam 50 is thereby not allowed to exhibit any displacement nor tilting at the first end 52. A second end 51 of the beam 50 is in contact with a body 56 in such a way that displacements are restricted, whereas tilting of the second end is allowed. This boundary is represented by the circle 53, indicating the forced hinge functionality.

A first resonant vibration mode 72 is qualitatively illustrated by means of two extreme strokes 61, 62 of a centre line 76 of a stationary beam. A first node 60 is as before present at the first end 52. A second node 67 is present at the second end 51, as a result of the boundary condition. The first vibration mode 72 is the fundamental flexural resonance vibration of the beam 50 having the above described boundary conditions, i.e. the order n=1. This can also be seen by the fact that all parts of the beam always exhibit strokes 63 in the same direction. In other words, when one part of the interior of the beam is bent upwards, all interior parts of the beam 50 are also positioned above the centre line 76 (except for the point of the first and second nodes). The vibration mode 72 is associated with a constant $K_1^{tilt}$ when referring to the relation (1). For a thin slender beam, $K_1^{tilt} \approx 15.4$.

A second resonant vibration mode 73 is qualitatively illustrated by means of two extreme strokes 68, 69 of a centre line 76 of a stationary beam. A first node 60 is also here present at the first end 52, and a second node 67 at the second end 51. The second vibration mode 73 is the second order flexural resonance vibration of the beam 50 having the above described boundary conditions, i.e. the order n=2. This can also be seen by the fact that two sections of the beam always exhibit strokes 64, 65 in opposite direction. In other words, when one section of the beam is bent upwards 65, some other interior parts of the beam 50 are nevertheless positioned below 64 the centre line 76. This gives typically rise to a node 66 in the interior of the beam. The vibration mode 73 is associated with a constant $K_2^{tilt}$ when referring to the relation (1).

Figure 6C:
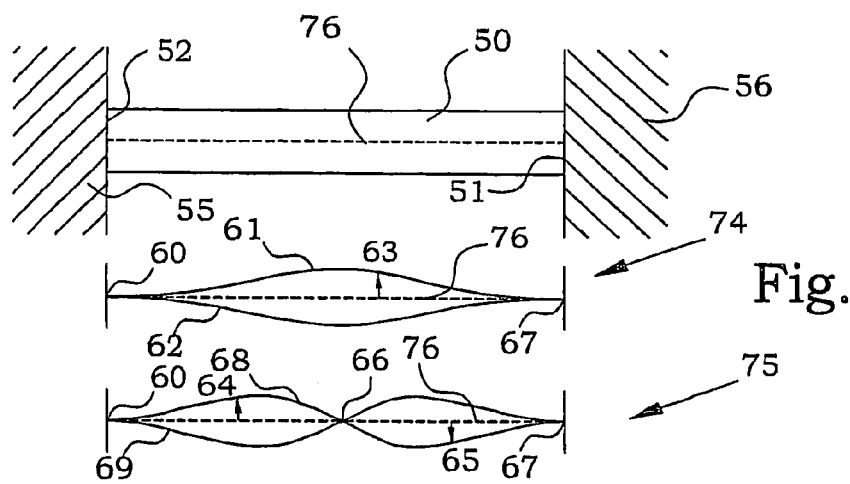

In FIG. 6C, yet another continuous uniform cantilever beam 50 is illustrated. The beam 50 is in this embodiment fixed at a first end 52 to a fundament 55, which restricts the vibration behaviour of the beam 50. The beam 50 is thereby not allowed to exhibit any displacement nor tilting at the first end 52. A second end 51 of the beam 50 is likewise fixed by a contact with a body 56 in such a way that neither displacements nor tilting are allowed. A first resonant vibration mode 74 is qualitatively illustrated by means of two extreme strokes 61, 62 of a centre line 76 of a stationary beam. A first node 60 is as before present at the first end 52. A second node 67 is present at the second end 51, as a result of the boundary condition. Note here that since the boundary conditions are different from FIG. 4B, the strokes of the beam in particular close to the second node 67 are also different. The first vibration mode 74 is the fundamental flexural resonance vibration of the beam 50 having the above described boundary conditions, i.e. the order n=1. This can also be seen by the fact that all parts of the beam always exhibit strokes 63 in the same direction. In other words, when one part of the interior of the beam is bent upwards, all interior parts of the beam 50 are also positioned above the centre line 76 (except for the point of the first and second nodes). The vibration mode 74 is associated with a constant $K_1^{fix}$ when referring to the relation (1). For a thin slender beam, $K_1^{fix} \approx 22.4$.

A second resonant vibration mode 75 is qualitatively illustrated by means of two extreme strokes 68, 69 of a centre line 76 of a stationary beam. A first node 60 is also here present at the first end 52, and a second node 67 at the second end 51. The second vibration mode 75 is the second order flexural resonance vibration of the beam 50 having the above described boundary conditions, i.e. the order n=2. This can also be seen by the fact that two sections of the beam always exhibit strokes 64, 65 in opposite direction. In other words, when one section of the beam is bent upwards 65, some other interior parts of the beam 50 are nevertheless positioned below 64 the centre line 76. This gives typically rise to a node 66 in the interior of the beam, i.e. an interior position exhibiting a zero stroke magnitude. The vibration mode 75 is associated with a constant $K_2^{fix}$ when referring to the relation (1).

When an actuating element moves without contact with a body to be moved, the conditions of FIG. 6A are assumed to describe the situation quite well. However, when the actuating element makes contact with the body to be moved different conditions could occur, which probably will have resemblances with the conditions of FIGS. 6B and 6C. As can be understood, it will be very difficult using the fundamental flexural cantilever frequency of a free end configuration, since the resonance frequency is extremely sensitive to how the second end is fixed. However, by tuning the used frequency into the region of the second resonance frequency of a beam with a free end (corresponding to $K_2^{free}$) these problems are significantly reduced. Since this resonance frequency is situated in the vicinity of the fundamental resonance frequency of beam according to FIG. 6B or 6C, a transfer between the second order vibration mode of FIG. 6A and a fundamental vibration mode somewhat similar to FIG. 6B or 6C is facilitated. The applied frequency will in both cases be close to a resonance frequency and thereby exhibit good-enhancement properties. In other words, the constants $K_2^{free}$, $K_1^{tilt}$ and $K_1^{fix}$ are situated relatively close to each other.

There is a possibility to find higher order bending vibration modes that will have similar frequencies as well. Presently, bending vibration modes having no more than one interior position within each actuating elements that exhibiting a zero stroke magnitude, is the most practical choice in most motor designs. It is, however, believed that higher order combinations exhibiting the same advantageous similarity between the constants $K_m^{free}$, $K_n^{tilt}$ and $K_n^{fix}$ could be used in certain particular motor designs and typically m=n+1. In other words, the second bending vibration mode, that is of a beam with either two fixed ends or one fixed end and one end hinged, is of a lower order, typically one step, than the order of the first bending vibration mode, i.e. of a beam with one fixed and one free end.

If also the thickness of the actuating element is adjusted to give a longitudinal resonance at a similar frequency, good driving properties are expected from the actuating elements.

The backbone is an important part of the motor or actuator and it has several functions. The high speed movement is in the present invention made by resonance and the resonator will always to some extent include the backbone. The glue in the embodiment of FIG. 4 will reduce this dependency, but there will always be some remaining dependency. It would of course be nice to have a motor where the only part being in resonance would be the actuating elements themselves, but mechanical vibrations will always to some extent involve the components being in closest mechanical contact with the actuating elements. In some embodiments of the present invention, the backbone itself may be designed to play a more important role in the excitation of the vibrator. FIG. 7 illustrates another embodiment of an actuator according to the present invention. The actuator 3 comprises in the present embodiment four "legs" or actuating elements 6 attached to a common backbone 5. In the present embodiment, the actuating elements 6 are attached to the backbone by co-sintering, giving an interface 15 allowing acoustic waves to be exchanged with the backbone 5 in a high degree. This means that the acoustic coupling between the actuating elements 6 and the backbone 5 is very good, and the entire actuator 3 will vibrate in modes comprising motions both in the backbone 5 and the actuating elements 6. The backbone 5 comprises in this embodiment non-electromechanically active material, and any vibrations are excited by action of the electromechanical volumes in the actuating elements 6 via the mechanical connection at the interfaces 15. The active material in the actuating elements exhibits a transversal contraction, which at the interface 15 influences the bending of the backbone 5. The backbone 5 is thus allowed to passively participate in the vibration.

Instead, the acoustic coupling between the backbone 5 and the actuator stator portion 4, in this embodiment the housing, is made weak. In the present embodiment, the backbone 5 is placed on pivot supports 16 attached to the housing, which means that bending modes of the backbone 5 having nodes at the pivot support 16 positions are favored, since very small amounts of acoustic energy is transferred to the actuator stator portion 4 in such a case. The pivot supports 16 are placed symmetrically outside the two central actuating elements, but inside the two outer actuator elements. The pivot supports can in alternative embodiments be designed as parts of the backbone 5, which simply are supporting against the housing surface.

Figure 8:
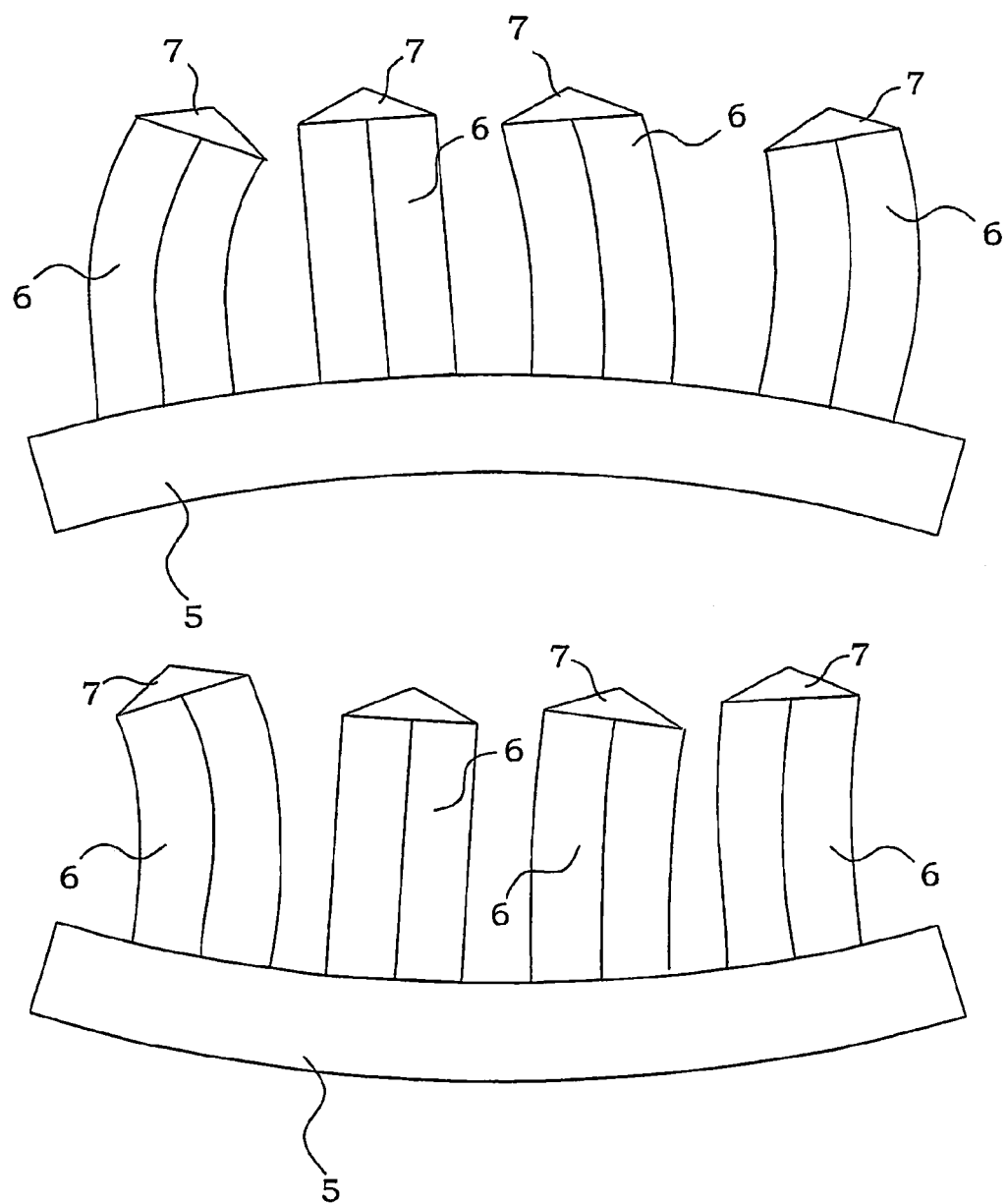
FIG. 8 is a schematic illustration of vibration states of the actuator of FIG. 7.

FIG. 8 illustrates some possible vibrations modes of the actuator of FIG. 7. The backbone performs essentially a bending motion, with nodes essentially at the pivot support positions. Such a bending will cause the actuating elements 6 to move up and down in the longitudinal direction. The longitudinal motion can in this embodiment during resonant operation replace the expansion/contraction of the actuating elements themselves, or a combination can be utilized. Any correspondence in resonance frequencies does not need to be considered, and there will be a larger degree of freedom to design the actuating elements. However, the possibility for utilizing longitudinal expansion has to remain, at least at lower frequencies, since such expansions are used during fine-positioning. A bending resonance of the actuating elements themselves gives the possibility to achieve a motion that can be used to give the body to be moved a motion in the displacement direction.

Figure 9:
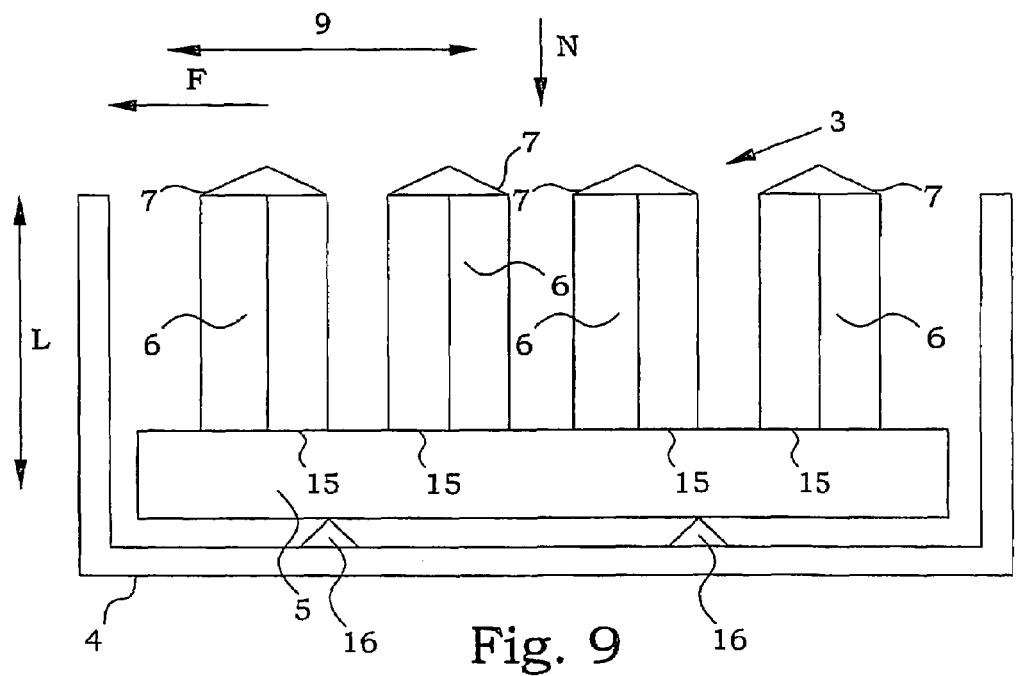
FIG. 9 is a block scheme of yet another embodiment of an actuator according to the present invention.

FIG. 9 illustrates yet another embodiment of an actuator 3 motor according to the present invention. The actuator 3 comprises also in the present embodiment four "legs" or actuating elements 6 attached to a common backbone 5. However, the actuating elements 6 are in this case placed at positions that are separated from the nodes. The backbone is asymmetrically arranged on the actuator stator portion 4 to allow for at least two different vibration modes. The present embodiment thus also uses the backbone actively in the resonator.

Figure 10:
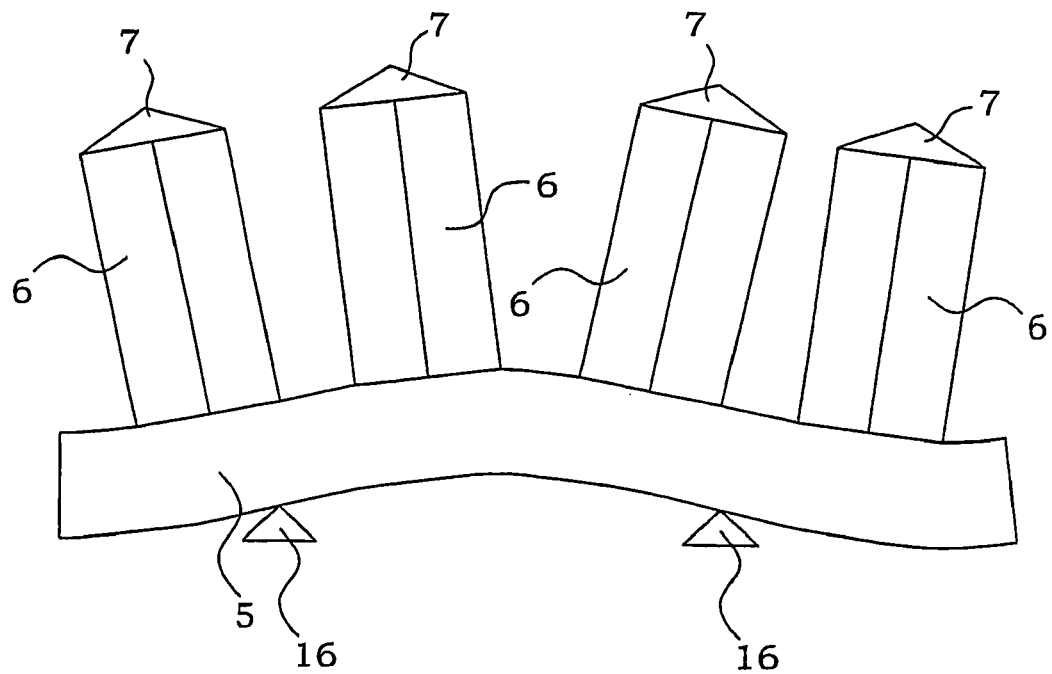
FIG. 10 is a schematic illustration of vibration states of the actuator of FIG. 9.
Figure 10:
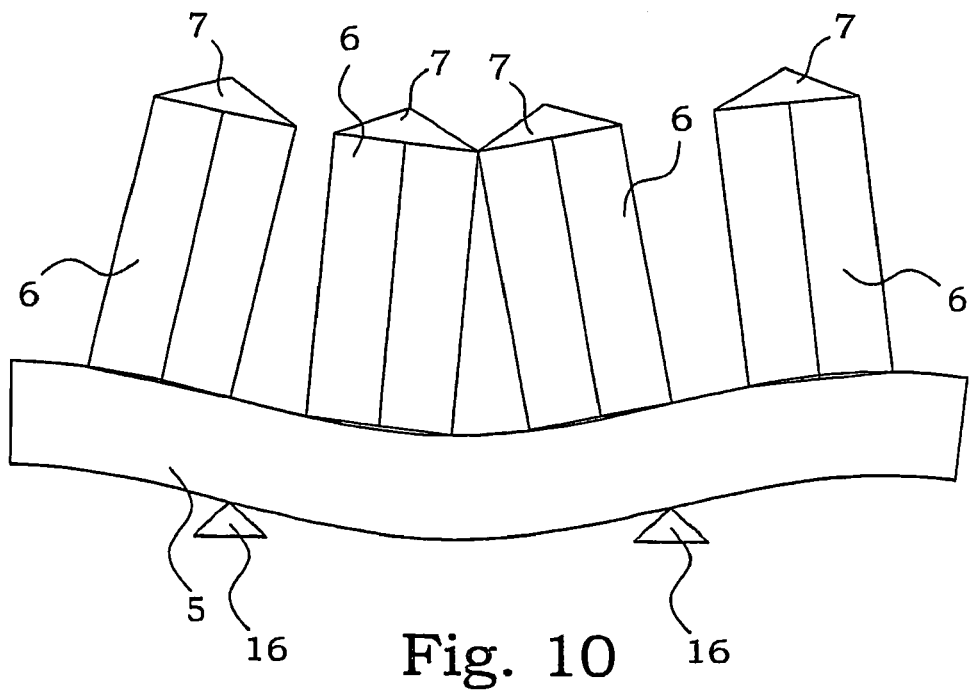

FIG. 10 illustrates some possible vibrations modes of the actuator of FIG. 9. The backbone performs essentially a bending motion. Since the nodes are located asymmetrically with respect to the actuating elements 6, such a bending will cause the actuating elements 6 to move up and down in the longitudinal direction and at the same time exhibit a tilting motion forward and back. As before, the longitudinal motion can in this embodiment during resonant operation replace the expansion/contraction of the actuating elements themselves, or a combination can be utilized. However, also here the possibility for utilizing longitudinal expansion has to remain, at least at lower frequencies, since such expansions are used during fine-positioning. The tilting motion in the present embodiment, maybe combined with a bending resonance of the actuating elements themselves, is used to achieve a motion that can be used to give the body to be moved a motion in the displacement direction.

Figure 11:
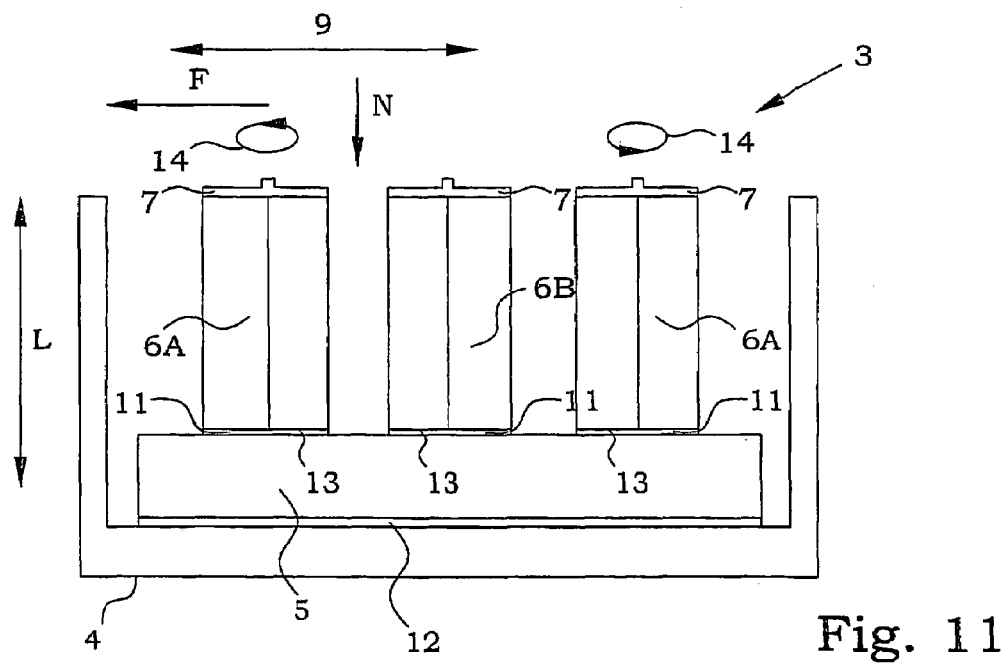
FIG. 11 is a block scheme of a further embodiment of an actuator according to the present invention.

FIG. 11 illustrates yet another embodiment of an actuator 3 motor according to the present invention. The actuator 3 somewhat resembles the actuator of FIG. 4, however, an intermediate actuating element 6B is provided between two other actuating elements 6A. The side actuating elements 6A are used for resonant high speed movement in analogy with what is described for the actuator of FIG. 4 as well as for fine positioning. The middle actuating element 6B is only used for fine positioning and is not at all activated during the high speed movement. If soft piezoceramic is used, the activated actuating elements 6A during resonance will always extend above the middle actuating element 6B and there will be no contact between the middle actuating element 6B and the body to be moved during the fast movement. When the fast movement is finished the actuating element 6B is used to make the final fine positioning in a stepwise manner. This actuating element could also have a much stiffer interaction portion in order to have the best possible fine positioning performance.

As indicated above, the fine positioning of the body can be performed in different ways. For the embodiment of e.g. FIG. 4, a standard walking method is easily implemented, where one actuating element always is in contact with the body, while the other resets to an initial position. Such walking mechanisms are discussed in many other prior art documents, e.g. in U.S. Pat. No. 6,798,117. However, similar embodiments, but with more actuating elements are also possible.

However, the fine-positioning movement strategy can be selected in different ways, some of which are described below. An advantage with these setups having only two actuating elements is that no planarisation of the actuating elements is necessary.

In one alternative fine-positioning movement strategy, both actuating elements are moved together in contact with the body and will thereby displace the body. However, after a certain distance, the actuating elements have to be restored into their starting shape again. The actuating elements are then moved with high acceleration backward so that the interaction portion will slip relative the body. The actuating elements are thereafter again moved slowly forward with full friction contact (stick). This type of stick-slip mechanism is suitable for moderate tangential and normal forces.

In another alternative fine-positioning movement strategy, both actuating elements are, in the restoring phase, moved with high acceleration backwards and downwards at the same time so that the interaction portions are released, or at least the normal force is reduced. There will be a relative movement between the body and interaction portion with small or no friction. The interaction portions are thereafter moved slowly forward and upward so that the body again is being displaced. This cycle is suitable when there are somewhat higher normal forces involved.

In yet another alternative fine-positioning movement strategy, the actuating elements are moved separately and in principle one at a time. One actuating element could be fixed or even vibrate to reduce the friction coefficient while the other is moving the body forward. The return part of the cycle for the actuating element that has moved the body is made by a combination of backward and downward movement. The advantage with this method is that the fixed actuating element will support most of the normal force, making it possible to operate with higher normal forces than in previous alternatives.

Figure 12:
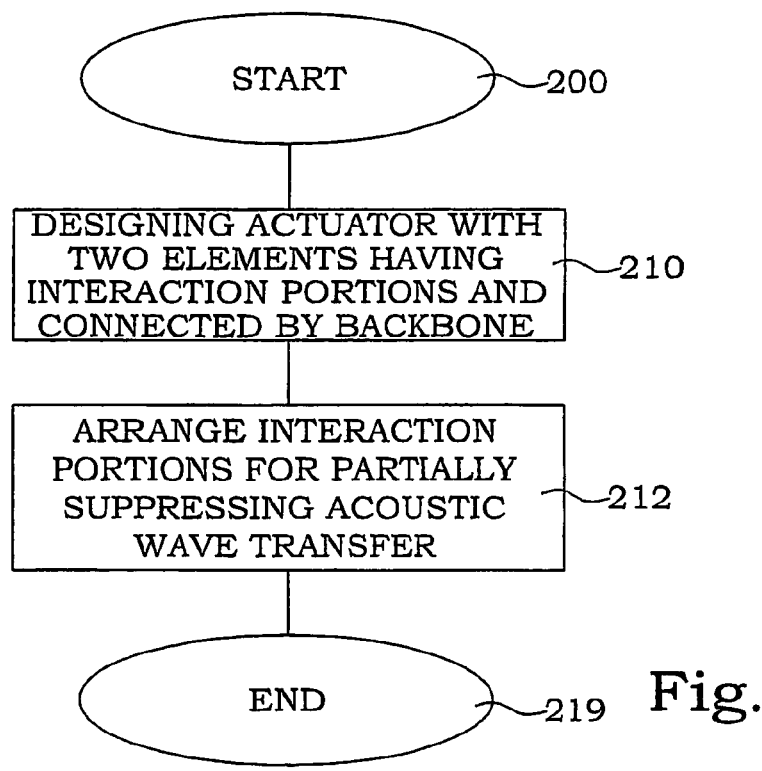
FIG. 12 is a flow diagram of an embodiment of a method according to the present invention.

Main steps of an embodiment of a designing method according to the present invention are illustrated in FIG. 12. The procedure starts in step 200. In step 210, an electromechanical actuator having at least two actuating elements with interaction portions for contacting a body to be moved, an actuator backbone, mechanically connecting the actuating elements and an actuator stator portion, mechanically supporting the actuator backbone. The actuating elements comprise an electromechanical monomorph, bimorph or multimorph volume, which upon excitation exhibits shape changes. The shape changes comprise a dimension change in a longitudinal direction directed between the actuator backbone and the interaction portion and a bending of the electromechanical monomorph, bimorph or multimorph volume perpendicular to the longitudinal direction and parallel to a main displacement direction of the body to be moved. In step 212, the interaction portions are arranged for partially suppressing transfer of acoustic waves between the actuating elements and the body to be moved. The procedure is ended in step 219.

Figure 13:
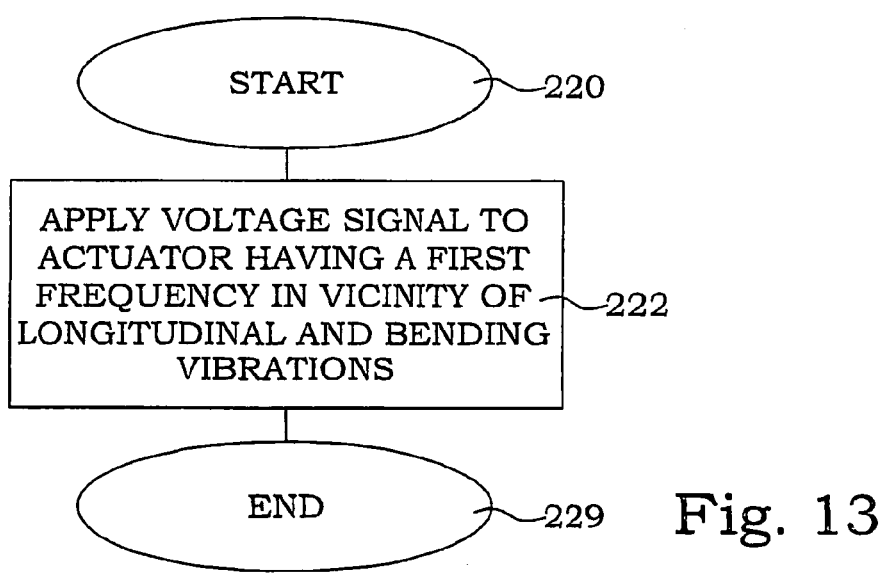
FIG. 13 illustrates the main steps of an embodiment of an operating method according to the present invention.

Main steps of an embodiment of an operating method according to the present invention are illustrated in FIG. 13. The procedure starts in step 220. In step 222, an electrical signal is applied to at least two actuating elements for excitation of shape changes thereof. The shape changes comprise a dimension change in a longitudinal direction directed between an actuator backbone and an interaction portion and a bending of the actuating element perpendicular to the longitudinal direction and parallel to a main displacement direction of a body to be moved. The frequency of the applied electrical signal is selected to be in a vicinity of a longitudinal vibration resonance of the dimension change as well as a bending vibration resonance of the bending. The procedure is ended in step 229.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Electromechanical actuator, comprising:
   at least two, independently movable, actuating elements;
   a first end of each said at least two actuating elements being a respective separate interaction portion for contacting a body to be moved;
   said interaction portions being free from mechanical contacts with any other parts than said body to be moved and said respective actuating body;
   an actuator backbone, mechanically connecting a respective second end of said at least two actuating elements opposite to a respective said first end;
   said at least two actuating elements each comprising an electromechanical monomorph, bimorph or multimorph volume, which upon excitation exhibits shape changes;
   said shape changes comprising a dimension change in a longitudinal direction directed between said actuator backbone and said interaction portion and a bending of said electromechanical monomorph, bimorph or multimorph volume perpendicular to said longitudinal direction and parallel to a main displacement direction of said body to be moved; and
   an actuator stator portion, mechanically supporting said actuator backbone;
   means for partially suppressing transfer of acoustic waves between each of said at least two actuating elements and said body to be moved comprising respective said interaction portions.

2. Electromechanical actuator according to claim 1, wherein said interaction portions having an acoustic impedance in said longitudinal direction that is considerably different from an acoustic impedance of said electromechanical monomorph, bimorph or multimorph volume of said actuating elements in said longitudinal direction.

3. Electromechanical actuator according to claim 2, wherein said acoustic impedance of said interaction portions in said longitudinal direction differs from said acoustic impedance of said electromechanical monomorph, bimorph or multimorph volume of said actuating elements in said longitudinal direction by more than 50%.

4. Electromechanical actuator according to claim 1, further comprising:
   means for providing a longitudinal compression of said interaction portion at a requested operation force between said body to be moved and said electromechanical actuator being within a predetermined interval;
   said means for providing a longitudinal compression comprises the elasticity of said interaction portions;
   means for causing a maximum of said dimension change in said longitudinal direction;
   means for causing a longitudinal compression of said actuating element at said requested operation force;
   whereby said predetermined interval being between 10% and 90% of a difference between said maximum of said dimension change in said longitudinal direction and said longitudinal compression of said actuating element at said requested operation force.

5. Electromechanical actuator according to claim 1, further comprising:
   means for providing a shearing of said interaction portion in said main displacement direction at a requested driving force between said body to be moved and said electromechanical actuator being within a predetermined interval;
   said means for providing a shearing comprises the elasticity of said interaction portions;
   means for causing a maximum stroke of said bending at said interaction portion;
   means for causing a shearing in said main displacement direction of said actuating element at said requested driving force;
   whereby said predetermined interval being between 10% and 90% of a difference between said maximum stroke of said bending at said interaction portion and said shearing in said main displacement direction of said actuating element at said requested driving force.

6. Electromechanical actuator according to claim 1, wherein a major part of said bending vibration takes place within respective said actuating elements.

7. Electromechanical actuator according to claim 6, wherein said actuating elements have an acoustic impedance which is considerably different from an acoustic impedance of said actuator backbone.

8. Electromechanical actuator according to claim 6, wherein said actuating elements are mechanically connected to said actuator backbone by means arranged for at least partially suppressing transfer of acoustic waves between said at least two actuating elements and said actuator backbone.

9. Electromechanical actuator according to claim 1, wherein said bending vibration involves both said at least two actuating elements and said actuator backbone.

10. Electromechanical actuator according to claim 9, wherein said actuator backbone is mechanically connected to said actuator stator portion by means arranged for at least partially suppressing transfer of acoustic waves between said actuator stator portion and said actuator backbone.

11. Electromechanical actuator, comprising:
    at least two, independently movable, actuating elements;
    a first end of each said at least two actuating elements being a respective separate interaction portion for contacting a body to be moved;
    said interaction portions being free from mechanical contacts with any other parts than said body to be moved and said respective actuating body;
    an actuator backbone, mechanically connecting a respective second end of said at least two actuating elements opposite to a respective said first end;
    said at least two actuating elements each comprising an electromechanical monomorph, bimorph or multimorph volume, which upon excitation exhibits shape changes;
    said shape changes comprising a dimension change in a longitudinal direction directed between said actuator backbone and said interaction portion and a bending of said electromechanical monomorph, bimorph or multimorph volume perpendicular to said longitudinal direction and parallel to a main displacement direction of said body to be moved; and
    an actuator stator portion, mechanically supporting said actuator backbone;

whereby said dimension change has a longitudinal vibration resonance at a first frequency; and
said bending has a bending vibration resonance in a vicinity of said first frequency.

12. Electromechanical actuator according to claim 11, wherein said bending vibration resonance in said vicinity of said first frequency corresponds to a bending vibration mode in which each one of said at least two actuating elements having a first portion exhibiting a stroke in an opposite direction compared to a simultaneous stroke of a second portion of the same each one of said at least two actuating elements.

13. Electromechanical actuator according to claim 12, wherein said bending vibration resonance in said vicinity of said first frequency corresponds to a bending vibration mode at all times having no more than one interior position within said at least two actuating elements exhibiting a zero stroke magnitude.

14. Electromechanical actuator according to claim 12, wherein said bending vibration resonance in said vicinity of said first frequency corresponds to a bending vibration mode at least at some instants having more than one interior position within said at least two actuating elements exhibiting a zero stroke magnitude.

15. Electromechanical actuator according to claim 11, wherein said at least two actuating elements has a thickness t in a direction of said bending vibration bending vibration being selected within a range in vicinity of:

$$t = \frac{\pi\sqrt{3}}{K_n} \cdot L$$

where L is a length of said at least two actuating elements, and $K_n$ is a bending vibration constant of order n of said at least two actuating elements.

16. Electromechanical actuator according to claim 15, wherein said bending vibration constant is in the vicinity of a bending vibration constant of a second order resonance vibration for an actuating element being fixed in one end and free in an opposite end.

17. Electromechanical motor, comprising:
an electromechanical actuator; and
a body to be moved;
said electromechanical actuator in turn comprising:
at least two, independently movable, actuating elements;
a first end of each said at least two actuating elements being a respective separate interaction portion for contacting a body to be moved;
said interaction portions being free from mechanical contacts with any other parts than said body to be moved and said respective actuating body;
an actuator backbone, mechanically connecting a respective second end of said at least two actuating elements opposite to a respective said first end;
said at least two actuating elements each comprising an electromechanical monomorph, bimorph or multimorph volume, which upon excitation exhibits shape changes;
said shape changes comprising a dimension change in a longitudinal direction directed between said actuator backbone and said interaction portion and a bending of said electromechanical monomorph, bimorph or multimorph volume perpendicular to said longitudinal direction and parallel to a main displacement direction of said body to be moved; and
an actuator stator portion, mechanically supporting said actuator backbone;
means for partially suppressing transfer of acoustic waves between each of said at least two actuating elements and said body to be moved comprising respective said interaction portions.

18. Electromechanical motor, comprising:
an electromechanical actuator; and
a body to be moved;
said electromechanical actuator in turn comprising:
at least two, independently movable, actuating elements;
a first end of each said at least two actuating elements being a respective separate interaction portion for contacting a body to be moved;
said interaction portions being free from mechanical contacts with any other parts than said body to be moved and said respective actuating body;
an actuator backbone, mechanically connecting a respective second end of said at least two actuating elements opposite to a respective said first end;
said at least two actuating elements each comprising an electromechanical monomorph, bimorph or multimorph volume, which upon excitation exhibits shape changes;
said shape changes comprising a dimension change in a longitudinal direction directed between said actuator backbone and said interaction portion and a bending of said electromechanical monomorph, bimorph or multimorph volume perpendicular to said longitudinal direction and parallel to a main displacement direction of said body to be moved; and
an actuator stator portion, mechanically supporting said actuator backbone;
whereby said dimension change has a longitudinal vibration resonance at a first frequency; and
said bending has a bending vibration resonance in a vicinity of said first frequency.

19. Method for driving electromechanical actuator having at least two actuating elements, each having an interaction portion for contacting a body to be moved, and an actuator backbone, mechanically connecting said at least two actuating elements, comprising the step of:
applying an electrical signal to an electromechanical monomorph, bimorph or multimorph volume of each of said at least two actuating elements for excitation of shape changes thereof;
said shape changes comprising a dimension change in a longitudinal direction directed between said actuator backbone and said interaction portion and a bending of said electromechanical monomorph, bimorph or multimorph volume perpendicular to said longitudinal direction and parallel to a main displacement direction of said body to be moved;
whereby a frequency of said applied electrical signal is selected to be in a vicinity of a longitudinal vibration resonance of said dimension change as well as a bending vibration resonance of said bending.

20. Method according to claim 19, wherein said frequency of said applied electrical signal is selected to be in vicinity of both a resonance frequency of a first bending vibration mode of an actuating element having a free interaction portion and a resonance frequency of a second bending vibration mode of an actuating element having an interaction portion exposed to displacement and/or tilting restrictions.

21. Method according to claim 20, wherein said second bending vibration mode is of an order of magnitude lower than said first bending vibration mode.

22. Method according to claim 19, wherein said first bending vibration mode in which said at least two actuating elements having a first portion exhibiting a stroke in an opposite direction compared to a simultaneous stroke of a second portion of the same each one of said at least two actuating elements.

23. Method according to claim 22, wherein said first bending vibration mode has no more than one interior position within said at least two actuating elements exhibiting a zero stroke magnitude so that said first bending vibration mode has one and only one node.

24. Method according to claim 22, wherein said first bending vibration mode at least at some instant has more than one interior position within said at least two actuating elements exhibiting a zero stroke magnitude so that said first bending vibration mode has two or more nodes.

25. Electromechanical actuator according to claim 15, wherein said bending vibration constant has a value above 15.

* * * * *